United States Patent [19]
Sharan

[11] Patent Number: 5,632,823
[45] Date of Patent: May 27, 1997

[54] SOLAR TRACKING SYSTEM

[76] Inventor: Anand M. Sharan, 67, Ennis Ave., St-John's, Newfoundland, Canada, A1A 1Y7

[21] Appl. No.: 593,468

[22] Filed: Jan. 29, 1996

[51] Int. Cl.$^6$ .................................................. H01L 31/042
[52] U.S. Cl. .................... 136/246; 250/203.4; 353/3; 126/602; 126/603; 126/605; 126/608
[58] Field of Search .................. 136/246; 353/3; 250/203.4; 126/575–576, 602–603, 605–608

[56] References Cited

U.S. PATENT DOCUMENTS

| | | | |
|---|---|---|---|
| 3,070,699 | 12/1962 | Lehmann et al. | 136/246 |
| 4,172,739 | 10/1979 | Tassen | 136/246 |
| 4,440,150 | 4/1984 | Kaehler | 126/602 |
| 4,476,853 | 10/1984 | Arbogast | 126/578 |
| 4,628,142 | 12/1986 | Hashizume | 136/246 |
| 4,832,001 | 5/1989 | Baer | 126/579 |

*Primary Examiner*—Aaron Weisstuch

[57] ABSTRACT

The solar tracking system maintains a solar collector with its responsive surface normal to the sun rays. It includes a shaft supported for rotation about an axis parallel to the north-south axis of the earth, a stepper motor for intermittent rotation of the shaft at a mean rate equal to the earth's rate of rotation. A solar collector securing assembly is located on one side of the shaft and includes a bracket, collars securing the bracket to the shaft, a support for fixing a solar collector pivoted to the bracket about a pivotal axis transverse to the shaft to vary the inclination of the support relative to the shaft and stays between the support and the bracket to maintain the support at an adjusted inclination. A counter-balancing system includes an arm secured to the shaft and extending normal thereto and away from the assembly and a weight adjustably mounted on the shaft. This system counter-balances the assembly and a solar collector fixed thereto irrespective of the rotational position of the assembly about the shaft and the inclination of the support relative to the shaft. Preferably, two solar collectors are mounted on the shaft, one being an array of solar cells feeding a battery which in turn feeds a stepper motor driving the shaft through a step down gear box. The sun shadow of a pointer normal to the solar collector panel serves to properly align the panel. Alternately, the current generated by the solar cells is measured and its maximum indicates that the solar panel is properly aligned with the sun.

14 Claims, 4 Drawing Sheets

SOLAR TRACKING SYSTEM

FIELD OF THE INVENTION

This invention relates to solar tracking devices, and particularly to a system for maintaining a solar collector with its responsive surface normal to the sun rays, as the sun, as seen from the earth, traverses in the sky from sunrise to sunset.

DISCUSSION OF THE PRIOR ART

Solar energy devices such as solar concentrators, work most efficiently when they are oriented favourably, based on their geometry, to the incoming solar rays. For a flat plate, this orientation is optimum when the rays are perpendicular to the plate. Since the position of the sun is continually changing, the receiving surface must also be continually reoriented to maintain the optimal orientation condition. The devices that track the solar position can be of two types; the first type utilize matched solar cells or other photoelectric sensors which generate a differential signal whenever the orientation of the device is not optimal. This signal is used in a feedback mechanism to reorient the receiver until the best orientation is achieved. Such devices have not proved to be very reliable because they fail to discriminate between the obscured sun and a bright spot, in a broken cloud. The feedback mechanism misorientates the receiver towards the bright spot rather than the sun. In this way, the tracking fails. Furthermore, these devices are not dependable under foggy or misty or dusty conditions.

The second type of mechanisms which track the sun, use clock mechanisms to control the orientation of the receiver at different times of a day. Unfortunately, to accurately follow the sun in its daily motion as well as its yearly (seasonal) motion, the devices have to be complex in their construction besides being expensive to build.

Another disadvantage with both types of systems mentioned above, is the energy requirement during the tracking because these are not mass balanced. Due to the imbalance, far more torque is required to correct the position of the receiver as compared to the balanced systems. Many times, it is not possible to attain the correct position, especially when the sun appears in the sky after a long interval of cloudy condition. Under such conditions, significant amount of torque is required for the receiver to attain the optimal orientation.

OBJECTS OF THE INVENTION

It is therefore the main object of the present invention to provide a solar tracking system which is accurate and yet requires minimum energy input and is simple and inexpensive to build and operate.

It is a further object of the present invention to provide several methods for solar tracking.

BRIEF DESCRIPTION OF THE DRAWINGS

In the annexed drawings, like references indicate like elements throughout.

DETAILED DESCRIPTION OF THE PREFERRED EMBODIMENT

Figure 1:
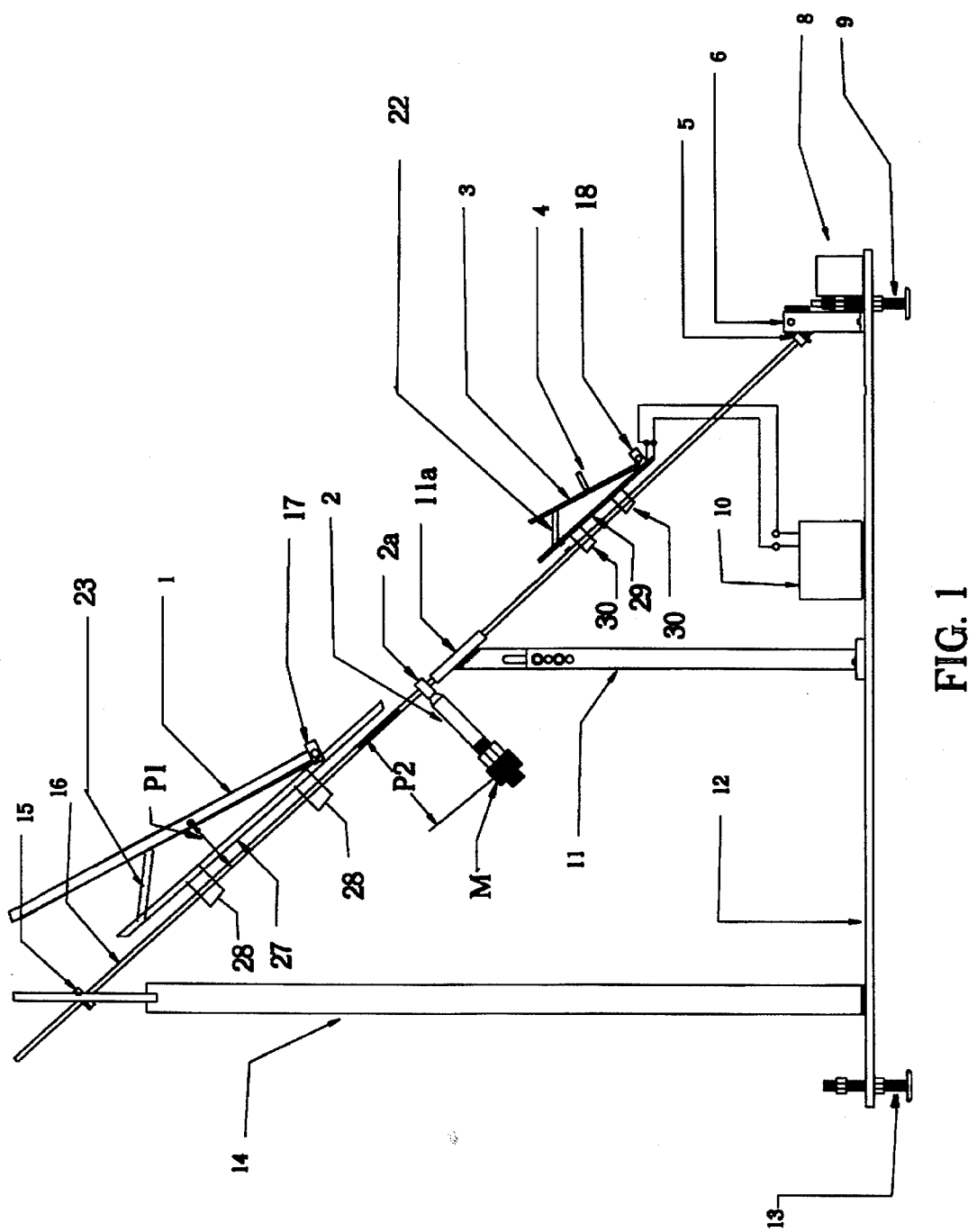
FIG. 1 is a side elevation of a preferred embodiment of the invention. It shows the orientation of the receivers between September 21 to March 21 in the northern hemisphere.

As shown in FIG. 1, brackets 27 and 29 are rigidly attached to a rotatable shaft 16 by collars 28 and 30 respectively. A support 1, which serves as a mounting platform for supporting a solar collector such as a receiver or reflector or a combination of both and of any geometrical shape is pivoted to bracket 27 by a pivot 17 perpendicular to shaft 16. Similarly, a support 3 is pivoted at 18 to bracket 29. It is possible to change the spatial orientation of collector supports 1 and 3 by inclining them using pivots 17 and 18 respectively, which may be desirable for concentrating the sun's rays due to yearly (seasonal) motion of the earth. Adjustable stays 23 and 22 hold the corresponding supports 1 and 3 at the required inclination respectively. Shaft 16 is held parallel to the north-south axis of the earth. This is possible by aligning a horizontal base plate 12, along the north-south direction. This base plate is horizontally held using four levelling screws, two of which are shown as 13 and 9 in this figure. The other two screws are behind these screws in this view. Shaft 16 subtends an angle equal to the latitude of the location where this system is used. Shaft 16 is supported by a roller bearing 15 and a tapered roller bearing 5 on its ends. A counter-balancing arm 2, which can slide along and rotate around along shaft 16, is adjustably fixed thereto; arm 2, which is normal to shaft 16, carries a counter-balancing mass M at an adjustable radial distance P2 from shaft 16. Mass M on the counter-balancing arm 2 can be moved in the radial direction relative to the shaft 16. The centre of gravity of the support 1 is at a radial distance P1 from the shaft 16. As shaft 16 is rotated, the moments of the masses of the solar collectors and of their securing assemblies, namely elements 1, 23, 27 and 28 and 3, 22, 29 and 30 are counter-balanced by mass M. If either or both supports 1 and 3 are rotated about pivots 17 and 18, then their radial distance from shaft 16 will change and one would have to change the radial distance of mass M from the shaft. A vertical column 11 provides support to shaft 16 in order to keep it straight. This column has a bushing 11a at its top through which the shaft passes for rotation and support. Bearings 15 and 5 are held on vertical columns 14 and 6 respectively columns 6, 11 and 14 are fixed to base plate 12. The solar collector carried by support 3 may consist of an array of solar cells. A pointer 4 is mounted normal to the array of solar cells carried by support 3. Pointer 4 is used to align the apparatus such that the receiver on support 1 or solar cells on support 3 are normal to the sun's rays. The length of the shadow of the pointer indicates the degree of misalignment. In the case of perfect alignment, there will not be any shadow. Pointer 4 could be mounted on support 1.

Figure 2:
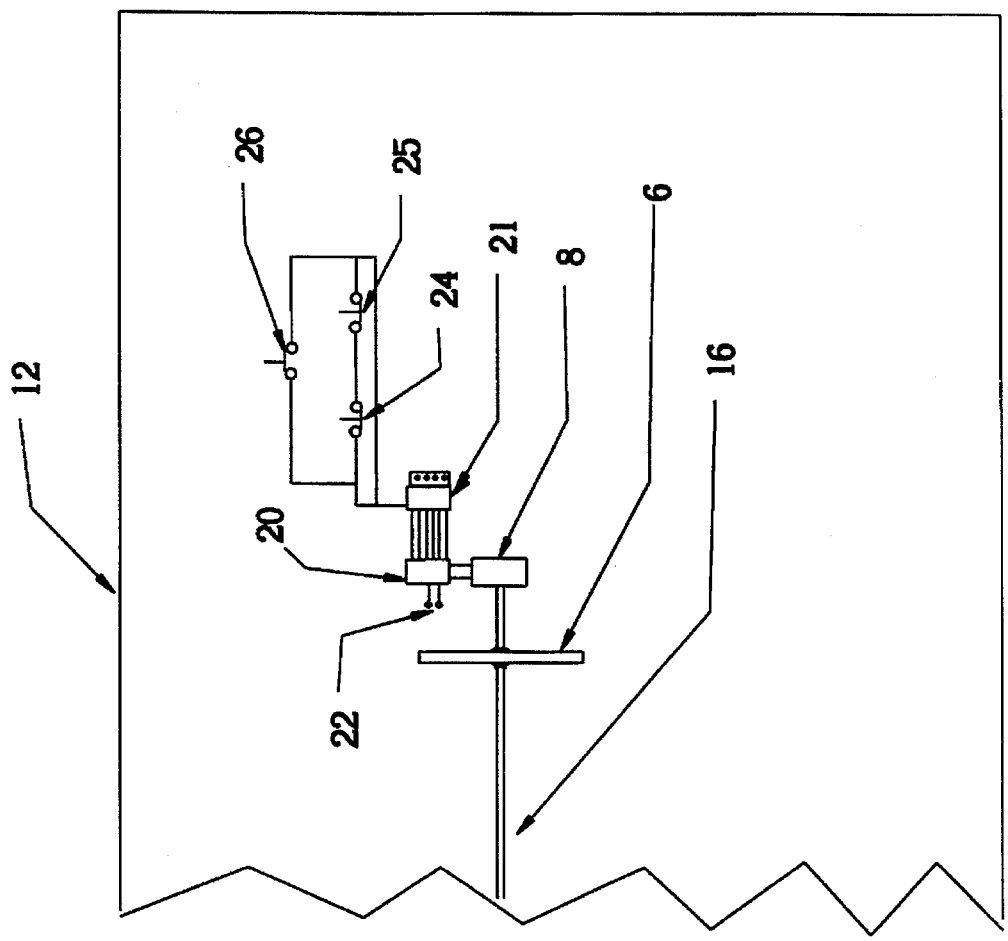
FIG. 2 is a top view of the motor driven system.

The mass balancing of the shaft can be done by first bringing the surfaces of the solar collectors mounted on supports 1 and 3 normal to the sun's rays using pivots 17 and 18 respectively, and by rotating the shaft 16. In this position, the counter-balance arm 2 is moved along the shaft and rotated about the shaft for a given radial position of mass M. In addition, one can displace mass M radially toward and from shaft 16. The solar cells, also referred to as solar panels, are used to charge a battery 10 which, in turn, can be used to power a stepper-motor 20 which drives shaft 16 through a gear system 8 as shown in FIG. 2. This stepper motor 20 is rotated by a series of pulses. It rotates a specified number of degrees per pulse, depending upon its construction. This type of motor can also operate on 110 volts, 220 volts etc. which are normally available in most places in the world. If a power supply is not available, then one can use the power generated by the solar cells (FIG. 1) to power motor 20. In FIG. 2, the supply voltage to motor 20 is not specified. This will depend on the place of use. In FIG. 2, the connection terminals of motor 20 are shown at 22 and the motor control is at 21.

The solar tracking can be done by rotating the mass balanced shaft 16 after first aligning the pointer 4 with the sun rays. The earth rotates 360 degrees (one revolution) in approximately 23 hours and 56 minutes about its north-south axis. The total time for one revolution is equal to 86, 160 seconds. Therefore, the earth rotates 1 degree in 239.333 seconds. Thus, the motor can be made to turn 1 degree at every 239.33 seconds by supplying to motor 20 the appropriate number of pulses required by controller 21 (FIG. 2). It should be noted that the power requirement of a motor decreases as the number of degrees to turn at a given time is decreased. For example, if we want to turn 5 degrees at every 1196.665 seconds interval instead of 1 degree at every 239.333 interval, then a more powerful motor (more costly motor, in general) will be required to do the job.

There are several methods to do the tracking. It will depend upon the situation where one method might prove better than the other.

The first and the simplest method is manually rotating shaft 16 by a certain number of degrees in a time interval based on the rotation rate of the earth, as discussed above. This can also be done merely by inspecting the shadow produced by pointer 4 i.e. the rotation of the shaft can be done in such a manner that there is no shadow of pointer 4. Since the earth rotates at a very slow rate, this method can be quite useful in many countries of the world where many people may not want to spend money on gear boxes, stepper motors etc. In such cases, shaft 16 has to be supported on bearings 15, and 5 (FIG. 1), and one needs a solar collector on one support 1 and the counter-balancing system 2, 2a and M. If one uses column 11, the system will perform better otherwise, the spacing between columns 14 and 6 can be made smaller, and one can eliminate column 11.

Figure 3:
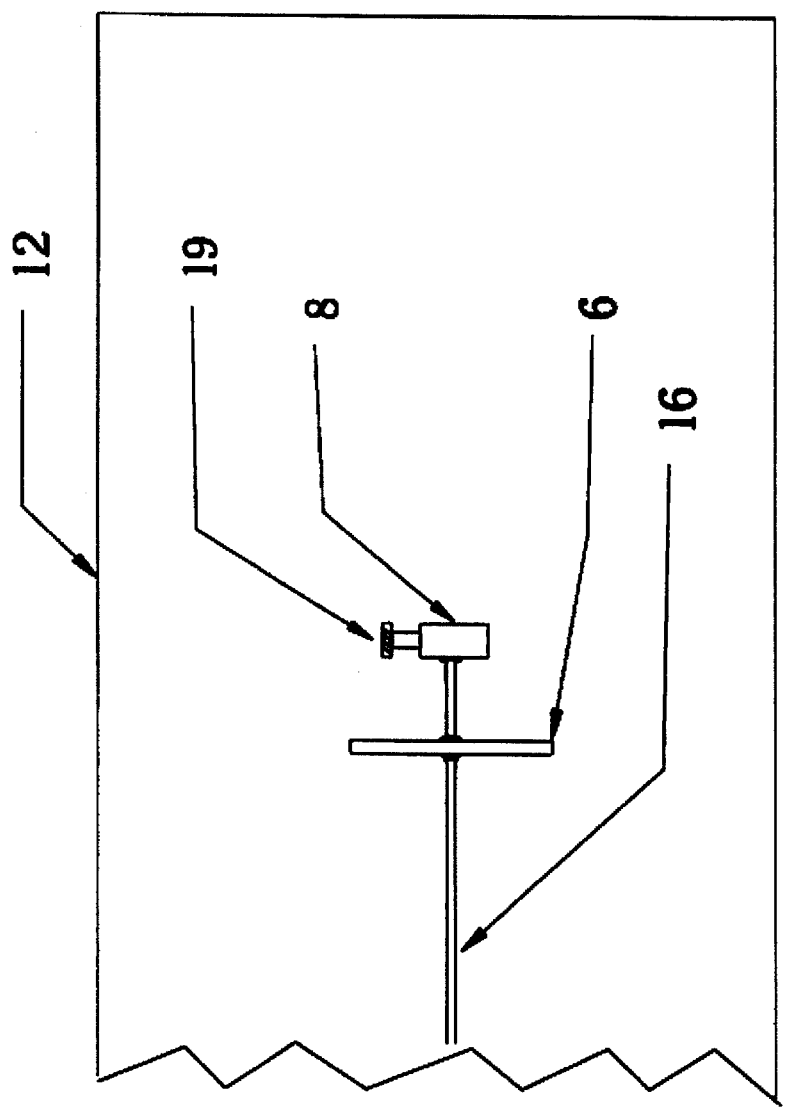
FIG. 3 is a top view of the manually driven system.

In the second method, which also does not require electrical parts, one can use a gear box where one can have a worm and worm gear system 8 as shown in FIG. 3. Worm rotation can be produced by using a knob 19. The torque required to turn knob 19 for a single start worm and an n tooth—gear will be, 1/n times that required to rotate the shaft having no gear system.

In the third method, where one uses a stepper motor 20 along with gear box 8 for optimal torque reduction, the system required can be seen in FIGS. 1 and 2. In this case, one can have two limit switches 24 and 25 (refer to FIG. 2), one for the starting position in the morning and the second one for the stopping position in the evening. One also needs a re-start switch 26. Here, one can rotate the shaft at a faster rate (most motors have controllers with features having variable pulse rates) in the morning to align pointer 4 parallel to the sun's rays. In this situation, the current output of the solar cells 3 will be a maximum as measured by a current meter (not shown). One can have wiring such that the current meter can be inside the house such that the alignment of pointer 4 can be easily checked from within the house. It is desirable to be able to align pointer 4 from inside the house in places having extreme weather conditions. If solar cells and a current meter are provided, the latter can be used to align the supports without the need of pointer 4. After aligning supports 1 and 3, one can set the stepper motor 20 (FIG. 2) to turn at the tracking speed (earth's rotational speed but in a direction opposite to that of earth) until the evening when the second limit switch 25 is activated to stop the motor rotation. The motor can then be rotated in the reverse direction at a faster rate, until it activates the first limit switch for stopping. In this way, the cycle can be repeated.

In the fourth method, depending upon the requirements, one can do away with the limit switches, and after aligning once, the stepper motor can be set to turn at the tracking speed even through the night because it will be in the alignment with the sun in the following days and months.

It should be noted that the solar collectors carried by supports 1 and 3 (refer to FIG. 1) have to be oriented normal to the sun's rays all the time. Misalignment can also arise due to seasonal variations (the yearly motion of the earth). The reorientation to correct the latter misalignment is effected by adjusting the inclination of supports 1 and/or 3 about pivots 17 and 18 using stays 22 and 23. The balancing of shaft 16 by re-adjusting counter-balancing system 2 is also required each time a solar collector inclination is changed because of the change of the radial distances of their respective centre of gravity. Furthermore, it should be clarified here that at a given time, motion is provided to the system about a single north-south axis. No motion is provided through the pivots 17 and 18. These pivots are used for the re-orientation of the solar receiving surfaces while the shaft is stationary.

In the fifth method, one has a reference position for the rotation of the shaft which can be the mid-night position. Representing the starting time in the morning as $t_M$, in seconds, the angular spacing at this time, from the mid-night position will be $O_M$. Based on the earth's rotational rate of one degree per 239.333 seconds, one can write $O_M = t_M/239.333$, degrees.

The mid-night position of the shaft is 180 degrees from the mid-day position. After starting in the morning at a set time, one can track the sun for the time $t_T$. The angular position for stopping relative to the starting position will be $O_E = t_T/239.333$, degrees.

The motor is then made to rotate in the reverse direction. Considering the angular speed of return to be N times the tracking speed, the time to return back to the morning position will be $t_R = t_T/N$ The time $t_I$, when the motor does not rotate, is $t_I = (86160 - t_M - t_R - t_T)$ Thus, the motor can be programmed to track the sun for the time $t_T$ then return to the original position rotating at N times the tracking speed for the time $t_R$. The motor remains idle for time $(t_I + t_M)$. To program this, the shaft has to be initially positioned at an angle $0_M$ from mid-night position, to start it after time $t_M$ from the mid-night position. It has to be borne in mind that the rotational rate of the motor has to be n times the rate of the shaft (considering that the speed reduction ratio of the gear box is n) during each of the motions (tracking or returning). The pulse rates to the motor by the controller have to be accordingly adjusted. In this method no one has to attend during the entire process.

Figure 4:
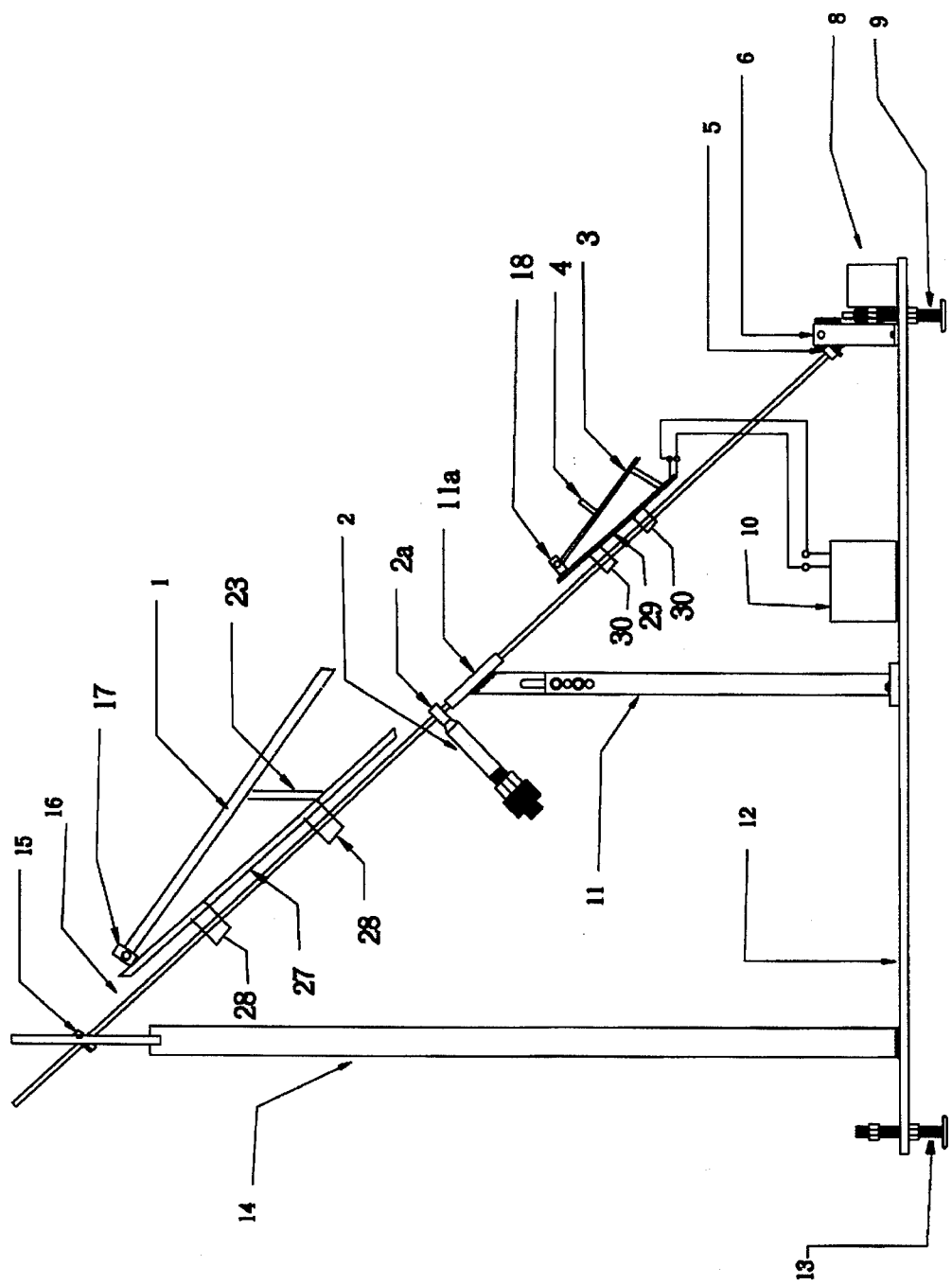
FIG. 4 is a side view similar to FIG. 1 but with the receivers reoriented to receive the solar energy between March 21 to September 21 in the northern hemisphere.

FIGS. 1 and 4 show the orientation of the receivers 1 and 3 during the periods of September 21 to March 21 and of March 21 to September 21 respectively, in the northern hemisphere.

In the first case, pivots 17, 18 are uppermost while in the second case pivots 17, 18 are lowermost. Collars 28 and 30 can be opened to reverse the position of supports 27 and 29 on shaft 16.

From the foregoing, it can be recognized that the present invention comprehensively deals with many conditions likely to be met and it provides systems and methods which will operate either attended or unattended with accuracy and dependability.

I claim:

1. A solar tracking system for maintaining a solar collector with its responsive surface normal to the sun rays, comprising a shaft; shaft support means rotatably supporting said shaft about a shaft rotation axis parallel to the north-south axis of the earth; shaft rotating means for intermittent rotation of said shaft at a mean rate equal to the earth's rate of rotation; a solar collector securing assembly located on one side of said shaft and including a collector support for fixing thereon a solar collector, a bracket, collar means for securing said bracket to said shaft, pivot means to pivot said support to said bracket about a pivotal axis transverse to said shaft to vary the inclination of said support and consequently of said collector relative to said shaft and stay means between said collector support and said bracket to maintain said collector support at an adjusted inclination relative to said shaft whereby the radial distance of the centre of gravity of said collector support and consequently of said collector from said shaft may vary, and a counterbalancing system including an arm secured to said shaft, extending generally normal to said shaft and away from said assembly and a weight mounted on said arm and radially adjustable relative to said shaft whereby the moment of the mass of said assembly and of a solar collector fixed thereto relative to said shaft can be substantially counter-balanced by said arm and said weight irrespective of the rotational position of said assembly about said shaft and of the inclination of said collector support relative to said shaft.

2. The system as defined in claim 1, wherein said shaft support means include a base plate, levelling means to level said base plate, a pair of columns upstanding from said base plate, said shaft inclined relative to said base plate and having an upper end and a lower end, a radial ball bearing means to support the upper end of said shaft on one of said columns and a tapered roller bearing means supporting the lower end of said shaft and carried by the other one of said columns.

3. The system as defined in claim 2, further including a third column secured to and upstanding from said base plate intermediate said first named columns and engaging and rotatably supporting the centre portion of said shaft to prevent sagging of the same.

4. The system as defined in claim 3, wherein said solar collector securing assembly is mounted on said shaft between said third column and the upper end of said shaft and further including a second solar collector securing assembly similar to said first named solar collector securing assembly and carried by the portion of said shaft located between said third column and the lower end of said shaft and on the same side of said shaft as said first named solar collector securing assembly, said arm and said weight of said counter balancing system capable of counter balancing both solar collector securing assemblies and the solar collectors fixed thereto, both collectors to be maintained with their responsive surface normal to the sun rays.

5. The system as defined in claim 4, in combination with a solar collector panel fixed to said second solar collector securing assembly, said panel consisting of solar cells, and further including a battery connected to said solar cells for storing the electrical energy produced thereby and further including an electric stepper motor drivingly connected to said shaft and fed by the electricity of said battery.

6. The system as defined in claim 1, further including a pointer upstanding from said collector support and casting a shadow when not aligned with the sun rays thereby furnishing an indication of the improper orientation of said support relative to the same.

7. The system as defined in claim 1, further including knob means for manually rotating said shaft a set number of degrees per equal time intervals.

8. The system as defined in claim 7, further including a gear box means between said shaft and said knob means.

9. Method for solar tracking a solar collector panel mounted at an adjustable inclination on a rotatable shaft supported parallel to the north-south axis of the earth, said panel adjustably counter-balanced about said shaft, said method comprising the steps of aligning said panel with the sun, and rotating said shaft in a step-wise manner by means of a stepper motor and a gear box in a direction reverse and at a mean rotational speed equal to the direction and speed of the earth rotation.

10. The method as defined in claim 9, wherein the rotation of said shaft is continuously effected in the same direction.

11. The method as defined in claim 9, wherein the shaft rotation is started at a set morning time and stopped at a set evening time and the shaft rotation is first reversed at a fast rate and then stopped during the time interval between said set evening time and said set morning time.

12. The method as defined in claim 9, wherein the step of aligning said panel is effected by adjusting the rotated position of said shaft and the inclination of said panel until the sun shadow of a pointer upstanding from and normal to said panel is reduced to zero.

13. A method as defined in claim 9, wherein said panel is formed of an array solar cells and the step of aligning said panel is effected by measuring the current output of said cells while adjusting the rotated position of said shaft and the inclination of said panel until the measured current is a maximum.

14. A method as defined in claim 9, wherein the step of aligning said panel with the sun is effected only once and further including the steps of programming said stepper motor to effect step-wise rotation at a solar tracking speed from a morning starting time tM, during the time $t_T$ and at a motor speed n and then reversing the motor direction during the time $t_R$ at a speed N time the tracking speed and stop for a time $t_I$ and to continuously repeat the cycle wherein $$t_I = (861160 - t_M - t_R - t_T)$$

wherein $t_M$, $t_R$ and $t_T$ are expressed in seconds starting from a preset reference time of a 86,160 seconds/day and wherein n is the speed reduction ratio of said gear box.

* * * * *